United States Patent
Obuchi

(10) Patent No.: US 6,669,310 B2
(45) Date of Patent: Dec. 30, 2003

(54) VEHICLE BRAKE CONTROL SYSTEM AND METHOD THEREFOR

(75) Inventor: Yutaka Obuchi, Susono (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/107,256

(22) Filed: Mar. 28, 2002

(65) Prior Publication Data

US 2002/0153771 A1 Oct. 24, 2002

(30) Foreign Application Priority Data

Apr. 19, 2001 (JP) ...................................... 2001-120571

(51) Int. Cl.$^7$ ................................................ B60T 8/60
(52) U.S. Cl. ................................. 303/155; 303/122.04
(58) Field of Search .............................. 303/155, 3, 20, 303/113.4, 122.04, 122.05

(56) References Cited

U.S. PATENT DOCUMENTS

| | | | | |
|---|---|---|---|---|
| 4,602,702 A | * | 7/1986 | Ohta et al. ...................... | 303/20 |
| 4,784,442 A | * | 11/1988 | Petersen ....................... | 303/15 |
| 5,230,549 A | * | 7/1993 | Osada et al. ................... | 303/3 |
| 5,954,407 A | * | 9/1999 | Schramm et al. ............ | 303/155 |
| 6,099,086 A | * | 8/2000 | Feigel et al. ............. | 303/113.4 |
| 6,244,675 B1 | * | 6/2001 | Behrends et al. ........... | 303/155 |
| 6,256,570 B1 | * | 7/2001 | Weiberle et al. ............ | 303/155 |
| 6,299,261 B1 | * | 10/2001 | Weiberle et al. ............... | 303/20 |
| 6,390,565 B2 | * | 5/2002 | Riddiford et al. ............... | 303/3 |

FOREIGN PATENT DOCUMENTS

| JP | A 11-301434 | 11/1999 |
|---|---|---|
| JP | A 2000-247219 | 9/2000 |

* cited by examiner

Primary Examiner—Robert A. Siconolfi
(74) Attorney, Agent, or Firm—Oliff & Berridge, PLC

(57) ABSTRACT

A brake control system and method controls a braking operation in a vehicle. When a pressure sensor and a stroke sensor are functioning normally, a brake control system calculates a final target deceleration Gt as a weighted sum of a target deceleration Gpt that is based on a master cylinder pressure Pm and a target deceleration Gst that is based on a depression stroke St, and a braking force is controlled based on the final target deceleration Gt. On the other hand, when there is an abnormality in the stroke sensor, the brake control system calculates a target deceleration Gpt that is greater than when the stroke sensor is functioning normally in a region where the braking amount is small, and the target deceleration Gpt is set to the final target deceleration Gt. When there is an abnormality in the pressure sensor, the brake control system calculates a target deceleration Gst that is larger than when the pressure sensor is functioning normally in a range where the braking amount is large, and the target deceleration Gst is set to the final target deceleration Gt.

13 Claims, 6 Drawing Sheets

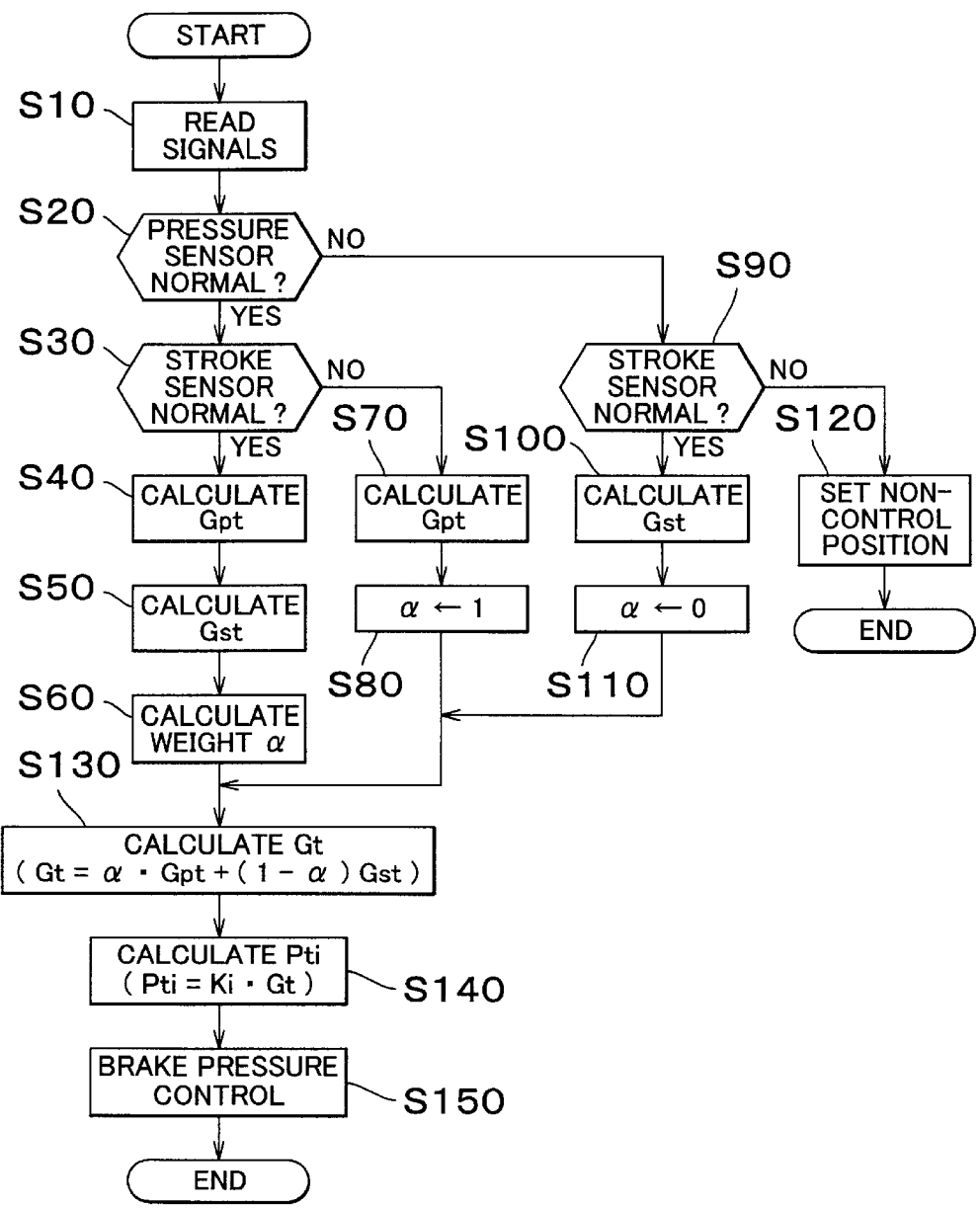

VEHICLE BRAKE CONTROL SYSTEM AND METHOD THEREFOR

INCORPORATION BY REFERENCE

The disclosure of Japanese Patent Application No. 2001-120571 filed on Apr. 19, 2001 including the specification, drawings and abstract is incorporated herein by reference in its entirety.

BACKGROUND OF THE INVENTION

1. Field of the Invention

The invention generally relates to a brake control system and method for braking a vehicle. More particularly, the invention relates to a brake control system that controls a braking force applied to each wheel based on an operational force applied to a braking member such as a brake pedal, and an amount of displacement of the braking member.

2. Description of Related Art

A brake control system in a vehicle such as an automobile, which controls the braking force of each wheel based on the force applied to a braking member and the amount of displacement of the braking member is well known. For example, a brake control system disclosed in Japanese Patent Application Laid-Open Publication No. 2000-247219 is such that a pressure sensor detects a master cylinder pressure Pm and a stroke sensor detects a depression stroke Sp of the brake pedal. The brake control system then calculates a target deceleration Gpt based on the master cylinder pressure Pm and calculates a target deceleration Gst based on the depression stroke Sp. The brake control system then calculates a final target deceleration Gt based on the target decelerations Gpt and Gst and controls the braking force of each wheel in accordance with this final target deceleration Gt.

In particular, the brake control system disclosed in the aforementioned publication is configured such that if any sensor changes from a normal state to an abnormal state, a deviation $\Delta Gt$ between the calculated final target deceleration Gt which includes the detection results of the sensor in which there is an abnormality and the calculated final target deceleration Gt which excludes the detection results of the sensor in which there is an abnormality is calculated. The final target deceleration Gt is then corrected with the deviation $\Delta Gt$ such that the deviation $\Delta Gt$ is gradually reduced.

Therefore, according to the brake control system proposed above, even if a sensor changes from a normal state to an abnormal state, there will not be a sudden change in the final target deceleration Gt. As a result, it is possible to reliably prevent a sudden change in the braking force and resultant deterioration of stability and controllability of the vehicle, and therefore a sense of discomfort to the vehicle operator, and the like.

Generally, in a brake control system the following calculations are performed: calculation of the target deceleration Gpt based on the master cylinder pressure Pm, calculation of the target deceleration Gst based on the depression stroke Sp, and calculation of the final target deceleration Gt based on the target decelerations Gpt and Gst. Then the brake control system controls the braking force of each wheel in accordance with this final target deceleration Gt. The target decelerations Gpt and Gst are calculated with respectively different patterns for the same amount of braking force applied by the vehicle operator.

For example, in a region where the braking amount by the vehicle operator is small, the depression stroke Sp reflects the amount of braking required by the vehicle operator more accurately than the master cylinder pressure Pm. Conversely, in a region where the braking amount by the vehicle operator is large, the master cylinder pressure Pm reflects the amount of braking required by the vehicle operator more accurately than the depression stroke Sp. Therefore, the target deceleration Gst is calculated in the region where the braking amount is small and the target deceleration Gst is set to contribute greatly to the final target deceleration Gt in the region where the braking amount is small. Also, the target deceleration Gpt is calculated in the region where the braking amount is large and the target deceleration Gpt is set to contribute greatly to the final target deceleration Gt in the region where the braking amount is large.

According to the brake control system proposed above, in the event that there is an abnormality in the pressure sensor, the target deceleration Gst is set to the final target deceleration Gt. Conversely, in the event that there is an abnormality in the stroke sensor, the target deceleration Gpt is set to the final target deceleration Gt. As a result, when there is an abnormality in any sensor, the relationship between the final target deceleration Gt and the braking amount by the vehicle operator changes, thus giving the vehicle operator a sense of discomfort when braking.

SUMMARY OF THE INVENTION

It is an object of the invention to provide a method and a brake control system of a vehicle, which is configured so as to control the braking force of each wheel based on a force applied to a braking member, and an amount of displacement of the braking member. The main objective of this invention is to reduce a sense of discomfort felt by the vehicle operator during braking when the detected value of the force applied to the braking member or the detected value of the amount of displacement of the braking member is abnormal. This is achieved by reducing a degree of change in the relationship between the final target deceleration Gt and the amount of braking by the vehicle operator generated when the detected value of the force applied to the braking member or the detected value of the amount of displacement of the braking member is abnormal.

According to an aspect of the invention, a method for controlling braking of a vehicle includes detecting a force applied to a braking member of the vehicle by an operator, detecting a displacement amount of the braking member, and calculating a final target brake control amount. The final target brake control amount further includes calculating a first target brake control amount on the basis of a first value of the force applied, calculating a second target brake control amount on the basis of a second value of the displacement amount, and calculating the final target brake control amount on the basis of the first target brake control amount calculated and the second target brake control amount calculated. When one of the values detected is abnormal, and the other one of values detected is normal, a degree of contribution of one of the first target brake control amount and the second target brake control amount is decreased, which is calculated on the basis of the abnormal detection value, to the final target brake control amount. A mode for calculating the other one of the first target brake control amount and the second target brake control amount is changed, which is calculated on the basis of the normal detection value, so as to reduce an influence of the decrease of the degree of contribution on the final target brake control amount.

According to another aspect of the invention, a brake control system for a vehicle includes a first detector that detects a force applied to a braking member of the vehicle by an operator of the vehicle, a second detector that detects a displacement amount of the braking member of the vehicle upon application of the force to the braking member, and a controller that calculates a first target brake control amount on the basis of a first value detected by the first detector, a second target brake control amount on the basis of a second value detected by the second detector, a final target brake control amount on the basis of the first target brake control amount and the second target brake control amount. When one of the values detected by the first detector and the second detector is abnormal, and the other one of values detected by the first detector and the second detector is normal, the controller decreases a degree of contribution of one of the first target brake control amount and the second target brake control amount, which is calculated on the basis of the abnormal detection value, to the final target brake control amount. The controller also changes a mode for calculating the other one of the first target brake control amount and the second target brake control amount, which is calculated on the basis of the normal detection value, so as to reduce an influence of the decrease of the degree of contribution on the final target brake control amount.

In the foregoing aspect of the invention, in the event that one of the detected p value of the force and the detected value of the amount of displacement of the braking member is abnormal, the amount of contribution of the target brake control amount which is calculated based on the abnormal detected value to the final target brake control amount is decreased. Then the calculation mode of the target brake control amount which is calculated based on the other detected value, that is, the normal value, is changed so as to reduce the effect caused by the decrease on the final brake control amount. Therefore, the likelihood that inappropriate brake control will be performed as a result of the target brake control amount which is calculated based on the abnormal detected value is able to be reliably reduced. In addition, a change in the relationship between the braking force of each wheel and the braking amount by the vehicle operator which is generated when one of the detected value of the force and the detected value of the amount of displacement of the braking member is abnormal, is reliably reduced. This reduction in the degree of the change in relationship thus reliably reduces a sense of discomfort felt by the vehicle operator during braking when the detected value of the force applied to the braking member or the detected value of the amount of displacement of the braking member is abnormal.

According to another aspect of the invention, the controller changes the mode for calculating the other one of the first and the second target brake control amount calculated on the basis of the normal detection value such that the decrease in the degree of contribution of one of the first target brake control amount and the second target brake control amount has a reduced influence on a relationship between the force applied to the braking member of the vehicle by the operator of the vehicle and the final target brake control amount.

According to the aforementioned aspect of the invention, the calculation mode of the target brake control amount that is calculated based on the other detected value, that is, normal value, is changed by changing the relationship between the target brake control amount and the normal detection value. Therefore, a change in the relationship between the amount of the brake controlled by the operator and the final target deceleration, which is generated when one of the detected value of the force and the detected value of the amount of displacement of the braking member becomes abnormal, is reliably reduced. This makes it possible to reduce the change more reliably compared, for example, with when only the contribution amount of the target brake control amount based on the other detected value, that is, the normal value, to the final target brake control amount is changed.

According to another aspect of the invention, when the force applied to the braking member of the vehicle and the displacement amount of the braking member have normal values, the controller calculates the final target brake control amount as a weighted sum of the first target brake control amount and the second target brake control amount.

In the aforementioned aspect of the invention, the amount of contribution of the target brake control amount which is calculated based on the abnormal detection value to the final target brake control amount is decreased to 0. This reliably prevents the braking force of the respective wheels from being inappropriately controlled due to the final target brake control amount that is calculated based on the abnormal detected value.

According to another aspect of the invention, the controller changes the mode for calculating the other one of the first and the second target brake control amount calculated on the basis of the normal detection value such that the decrease in the degree of contribution of one of the first target brake control amount and the second target brake control amount has a reduced influence on a relationship between the force applied to the braking member of the vehicle by the operator of the vehicle and the final target brake control amount.

According to another aspect of the invention, when the force applied to the braking member of the vehicle by the operator of the vehicle detected by the first detector has an abnormal value, the controller changes the mode for calculating the second target brake control amount such that a ratio of the second target brake control amount to the final target brake control amount is increased to be larger than a ratio of the second target brake control amount to the final target brake control amount obtained when the force applied to the braking member has a normal value in an area where the force applied to the braking member of the vehicle by the operator is small.

According to another aspect of the invention, when the displacement amount of the braking member of the vehicle detected by the second detector has an abnormal value, the controller changes the mode for calculating the first target brake control amount such that a ratio of the first target brake control amount to the final target brake control amount is increased to be larger than a ratio of the first target brake control amount to the final target brake control amount obtained when the displacement amount of the braking member of the vehicle has a normal value in an area where the force applied to the braking member of the vehicle by the operator is large.

According to still another aspect of the invention, when the force applied to the braking member of the vehicle and the displacement amount of the braking member have normal values, the controller calculates the final target brake control amount as a weighted sum of the first target brake control amount and the second target brake control amount.

According to still yet another aspect of the invention, when the force applied to the braking member of the vehicle and the displacement amount of the braking member have normal values, the controller calculates the final target brake control amount to a weighted sum of the first and the second target brake control amounts. When one of the force applied to the braking member of the vehicle and the displacement amount of the braking member has an abnormal value and the other value has a normal value, the controller sets a weight to the one of the first and the second target brake control amounts calculated on the basis of the abnormal detection value to 0 so as to set the degree of contribution of the one of the first and the second target brake control amounts calculated on the basis of the abnormal detection value to the final target brake control amount to 0.

BRIEF DESCRIPTION OF THE DRAWINGS

FIG. 2 is a flowchart showing a braking force control routine according to one exemplary embodiment of this invention;

DETAILED DESCRIPTION OF THE EXEMPLARY EMBODIMENTS

Hereinafter, the invention will be described in detail with respect to exemplary embodiments referring to the accompanying drawings.

Figure 1A:
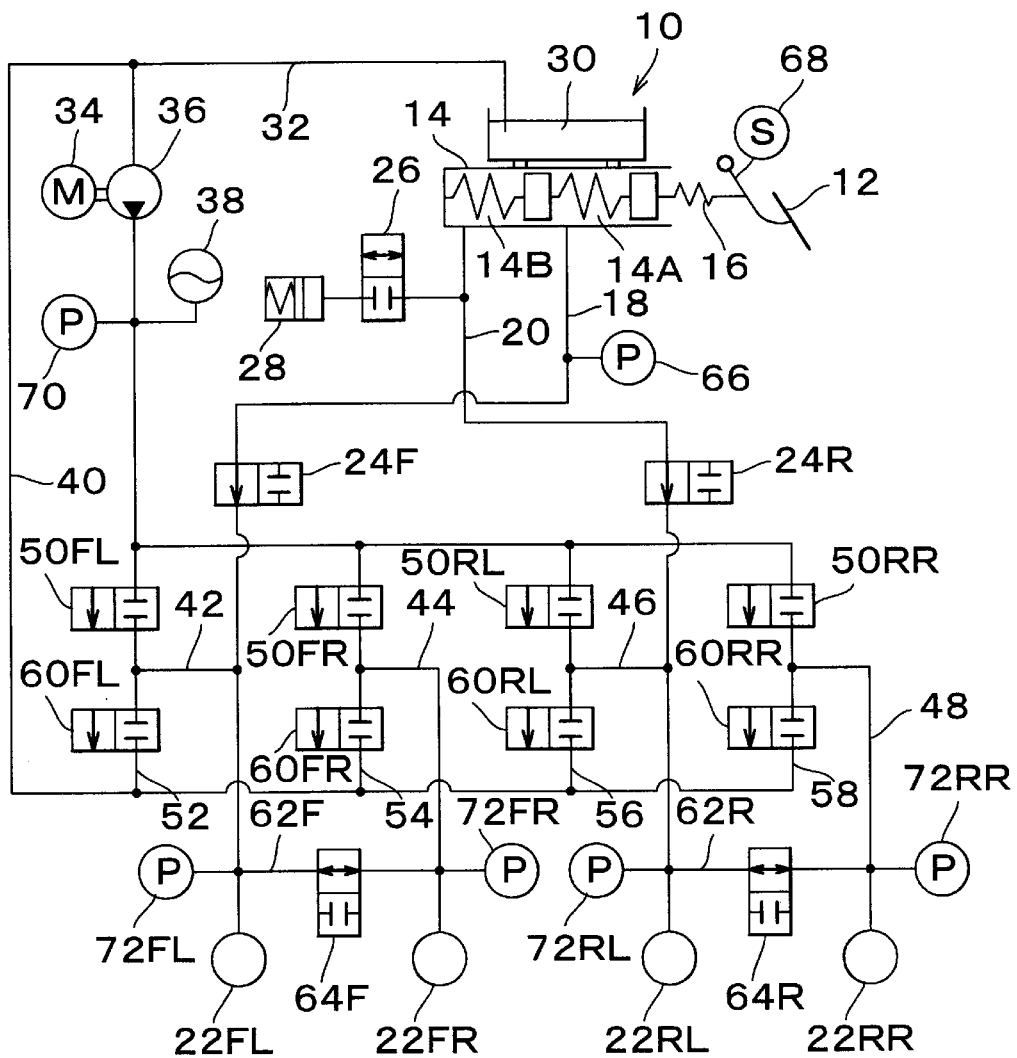
FIG. 1A is a block diagram schematically showing a hydraulic path of a brake control system according to one exemplary embodiment of this invention.
Figure 1B:
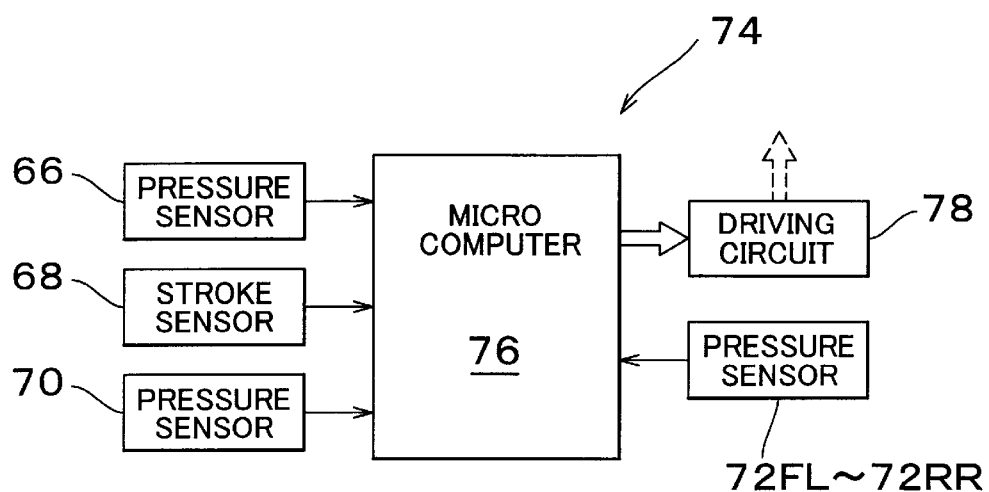
FIG. 1B is a block diagram schematically showing an electronic control unit of a brake control system according to one exemplary embodiment of this invention.

FIGS. 1A and 1B show block diagrams representing a hydraulic circuit and an electronic control unit (ECU) 74 in a vehicle brake control system according to an embodiment of the invention. In FIG. 1A, each solenoid of the respective electromagnetic switching valves is omitted for simplifying the drawing.

An electrically controlled hydraulic braking device 10 includes a master cylinder 14 that supplies a brake oil under pressure in response to depression of a brake pedal 12 operated by a vehicle operator. A dry stroke simulator 16 is disposed between the brake pedal 12 and the master cylinder 14.

The master cylinder 14 includes a first master cylinder chamber 14A and a second master cylinder chamber 14B. The ends of a brake oil pressure control pipe 18 for front wheels and a brake oil pressure control pipe 20 for rear wheels are connected to the master cylinder chambers 14A and 14B, respectively. Wheel cylinders 22FL and 22RL for controlling the braking force applied to the front left wheel and the rear left wheel are connected to the other ends of the brake oil pressure control pipes 18 and 20, respectively.

Electromagnetic switching valves (master cut valves) 24F and 24R that are open during normal operation are provided in the brake oil pressure control pipes 18 and 20, respectively. The electromagnetic switching valves 24F and 24R function as cutoff devices for controlling communication between the first master cylinder chamber 14A, the second master cylinder chamber 14B and the corresponding wheel cylinders. A wet stroke simulator 28 is connected to the brake oil pressure control pipe 20 between the master cylinder 14 and the electromagnetic switching valves 24F, 24R via an electromagnetic switching valve 26 that is closed during normal operation.

A reservoir 30 is connected to the master cylinder 14. The reservoir 30 is also connected to one end of a hydraulic pressure supply pipe 32. An oil pump 36 driven by an electric motor 34 is provided in the hydraulic pressure supply pipe 32. An accumulator 38 for accumulating a high hydraulic pressure is connected to the hydraulic pressure supply pipe 32 on a discharge side of the oil pump 36. One end of a hydraulic pressure discharge pipe 40 is connected to the hydraulic pressure supply pipe 32 between the reservoir 30 and the oil pump 36.

The hydraulic pressure supply pipe 32 on the discharge side of the oil pump 36 is connected to the brake oil pressure control pipe 18 between the electromagnetic switching valve 24F and the wheel cylinder 22FL via a hydraulic pressure control pipe 42, and is connected to a wheel cylinder 22FR for the front right wheel by a hydraulic pressure control pipe 44. The hydraulic pressure supply pipe 32 on the discharge side of the oil pump 36 is also connected to the brake oil pressure supply pipe 20 between the electromagnetic switching valve 24R and the wheel cylinder 22RL via a hydraulic pressure control pipe 46, and is connected to a wheel cylinder 22RR for the rear right wheel by a hydraulic pressure control pipe 48.

Electromagnetic switching valves 50FL, 50FR, 50RL, 50RR are provided in the hydraulic pressure control pipes 42, 44, 46, 48, respectively, and are closed during normal operation. The hydraulic pressure control pipes 42, 44, 46, 48 on the side of the wheel cylinders 22FL, 22FR, 22RL, 22RR relative to the electromagnetic switching valves 50FL, 50FR, 50RL, 50RR are connected to the hydraulic pressure discharge pipe 40 via hydraulic pressure control pipes 52, 54, 56, 58 respectively. Electromagnetic switching valves 60FL, 60FR, 60RL, 60RR are provided in the hydraulic pressure control pipes 52, 54, 56, 58 respectively.

Each of the electromagnetic switching valves 50FL, 50FR, 50RL, 50RR functions as a compression control valve for each of the wheel cylinders 22FL, 22FR, 22RL, 22RR. Each of the electromagnetic switching valves 60FL, 60FR, 60RL, 60RR functions as a decompression control valve for each of the wheel cylinders 22FL, 22FR, 22RL, 22RR. Accordingly, electromagnetic switching valves 50FL, 50FR, 50RL, 50RR and 60FL, 60FR, 60RL, 60RR constitute compression/decompression control valves, respectively, that cooperate with each other so as to control supply and discharge of high-pressure oil in the accumulator 38 to and from the respective wheel cylinders.

The brake oil pressure control pipe 18 for the front wheels is connected to the hydraulic pressure control pipe 44 for the front right wheel via a connection pipe 62F at a location near the corresponding wheel cylinders 22FL, 22FR. An electromagnetic switching F valve 64F, which is open during normal operation, is provided in the connection pipe 62F and functions as a communication control valve for controlling communication between the wheel cylinders 22FL and 22FR.

Similarly, the brake oil pressure control pipe 20 for the rear wheels is connected to the hydraulic pressure control pipe 48 for the rear right wheel via a connection pipe 62R at a location near the corresponding wheel cylinders 22RL, 22RR. An electromagnetic switching valve 64R provided in the connection pipe 62R functions as a communication control valve for controlling communication between the wheel cylinders 22RL and 22RR and is open during normal operations.

Referring to FIG. 1B, a pressure sensor 66 is provided in the brake hydraulic pressure control pipe 18 between the first master cylinder compartment 14A and the electromagnetic switching valve 24F, for detecting a pressure in the control pipe as a master cylinder pressure Pm. The master cylinder pressure Pm is detected as a value corresponding to the braking force applied by vehicle operator to the brake pedal 12.

The brake pedal 12 is provided with a stroke sensor 68 that detects a depression stroke St of the brake pedal 12 as a degree of displacement resulting from the braking operation of the vehicle operator. A pressure sensor 70 that detects the pressure in the hydraulic pressure supply pipe 32 as an accumulator pressure Pa is provided in the hydraulic pressure supply pipe 32 on the discharge side of the oil pump 36.

Pressure sensors 72FL and 72RL that detect pressures in the corresponding brake oil supply pipes as pressures Pfl, Prl in the corresponding wheel cylinders 22FL, 22RL are provided in the brake oil pressure control pipes 18 and 20 between the electromagnetic switching valve 24F and the wheel cylinder 22FL, and the electromagnetic switching valve 24R and the wheel cylinder 22RL, respectively. In addition, pressure sensors 72FR and 72RR for detecting pressures in the corresponding hydraulic pressure control pipes 44, 48 as pressures Pfr, Prr in the corresponding wheel cylinders 22FR, 22RR are respectively provided in the hydraulic pressure control pipes 44 and 48 between the electromagnetic switching valve 50FR, 50RR and the wheel cylinder 22FR, 22RR.

The electromagnetic switching valves 24F, 24R, electromagnetic switching valve 26, electric motor 34, electromagnetic switching valves 50FL, 50FR, 50RL, 50RR, electromagnetic switching valves 60FL, 60FR, 60RL, 60RR, and electromagnetic switching valves 64F, 64R are controlled by an electronic control unit (ECU) 74 as described below in detail. The ECU 74 includes a microcomputer 76 and a driving circuit 78.

A driving current is applied from a battery (not shown) to each electromagnetic switching valve and the electric motor 34 through the driving circuit 78. Particularly at a non-control state in which no driving current is applied to each electromagnetic switching valve and the electric motor 34, the electromagnetic switching valves 24F, 24R and 64F, 64R are retained in an open state. Meanwhile, the electromagnetic switching valves 26, 50FL, 50FR, 50RL, 50RR and 60FL, 60FR, 60RL, 60RR are retained in a closed state i.e., non-control mode.

Although not shown in detail in FIG. 1B, the microcomputer 76 may have a common structure including, for example, a central processing unit (CPU), a read only memory (ROM), a random access memory (RAM), and an input/output (LO) port, which are connected to each other via a bi-directional common bus.

Into the microcomputer 76 are input a signal from the pressure sensor 66 showing the master cylinder pressure Pm, a signal from the stroke sensor 68 indicating the depression stroke St of the brake pedal 12, a signal from the pressure sensor 70 indicating the accumulator pressure Pa, and signals from the pressure sensors 72FL through 72RR indicating the pressure Pi (i=fl, fr, rl, rr) within the respective wheel cylinders 22FL through 22RR.

The microcomputer 76 stores the of brake force control routine shown in FIG. 2, to be described later, and estimates the amount of braking required by the vehicle operator based on the master cylinder pressure Pm detected by the pressure sensor 66 and the depression stroke St detected by the stroke sensor 68. The microcomputer 76 calculates a final target deceleration Gt of the vehicle based on the estimated amount of required braking, then calculates the target brake pressure Pti (i=fl, fr, rl, rr) of each wheel based on this final target deceleration Gt, and then controls the wheel cylinder pressure of each wheel so that it becomes equal to the target brake pressure Pti.

The microcomputer 76 also determines, according to a sensor-normal determination routine (not shown), whether the pressure sensor 66 and the stroke sensor 68 are functioning normally, i.e., whether an abnormality in which the braking amount by the vehicle operator is entirely undetectable has occurred, such as a disconnection or short circuit of these sensors, or an abnormality in which the braking amount by the vehicle operator is unable to be detected appropriately has occurred, such as an abnormality in the gain. The sensor-normal detection can be performed in a variety of different ways that are well known in this technical field.

Further, the ECU 74 operates the oil pump 36 by driving the electric motor 34 based on the accumulator pressure Pa detected by the pressure sensor 70, so that the pressure within the accumulator is maintained at a pressure equal to, or above, a lower limit value and equal to, or below, an upper limit value, which are set beforehand.

The actuator can be of any configuration that is well known in this technical field, such as a hydraulic pressure path for controlling the braking force of each wheel, as long as the braking force of each wheel can be controlled by the ECU 74 based on the master cylinder pressure Pm detected by the pressure sensor 66 and the depression stroke St detected by the stroke sensor 68.

Next, a braking force control routine according to the illustrated embodiment will be described with reference to the flowchart shown in FIG. 2. The control routine according to the flowchart shown in FIG. 2 is performed repeatedly at predetermined intervals of time, starting from when an ignition switch (not shown), is switched on.

First in step S10, the signals and the like indicating the master cylinder pressure Pm detected by the pressure sensor 66 are respectively read. Although not shown, the electromagnetic switching valve 24F and the like is set to a control position before step S10 is conducted, such that the braking force of each wheel is able to be controlled by the ECU 74.

In step S20, it is determined whether the pressure sensor 66 is functioning normally in the sensor-normal determination routine (not shown). If NO is obtained in step S20, i.e., if it is determined that there is an abnormality in the pressure sensor 66, the routine proceeds to step S90. If YES is obtained in step S20, the routine proceeds to step S30.

In step S30, it is determined whether the stroke sensor 68 is functioning normally in the sensor-normal determination routine (not shown). If NO is obtained, i.e., if it is determined that there is an abnormality in the stroke sensor 68, the routine proceeds to step S70. If YES is obtained, the routine proceeds to step S40, where the target deceleration Gpt is calculated based on the master cylinder pressure Pm referring to a map which corresponds to the graph as shown by the solid line in FIG. 3.

Figure 4:
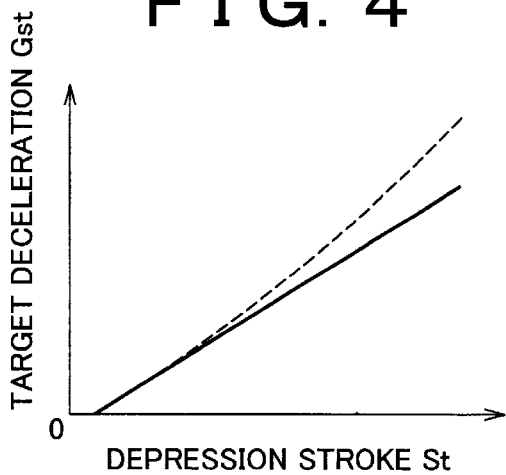
FIG. 4 is a graph showing a relationship between a depression stroke of a brake pedal and a target deceleration.
Figure 5:
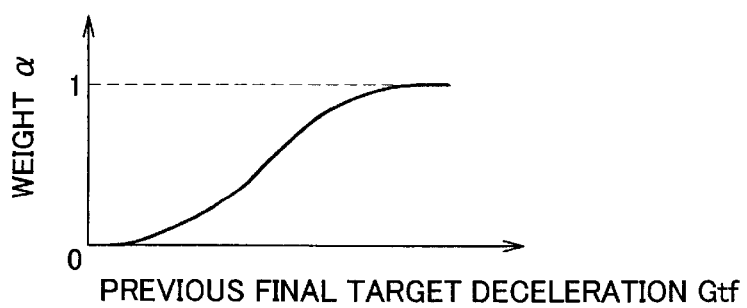
FIG. 5 is a graph showing a relationship between the previous final target deceleration and a weight to be applied to the target deceleration.

In step S50, the target deceleration Gst is calculated based on the depression stroke St referring to a map which corresponds to the graph as shown by the solid line in FIG. 4. Then in step S60, the weight $\alpha$ ($0 \leq \alpha \leq 1$) to be applied to the target deceleration Gpt is calculated based on the previous final target deceleration Gtf referring to a map which corresponds to the graph shown in FIG. 5.

Figure 3:
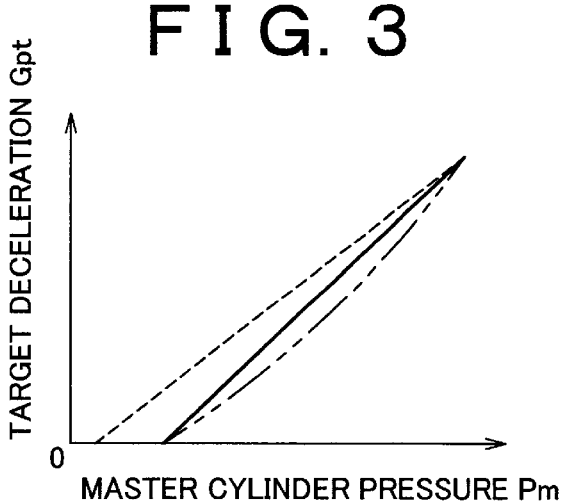
FIG. 3 is a graph showing a relationship between a master cylinder pressure and a target deceleration.

In step S70, the target deceleration Gpt is calculated based on the master cylinder pressure Pm referring to a map (a map of when there is an abnormality in the pressure sensor 70) which corresponds to the graph as shown by the dotted line in FIG. 3. Then in step S80, the weight $(1-\alpha)$ to be applied to the target deceleration Gst which is based on the depression stroke is set to 0 by setting the weight a to be applied to the target deceleration Gpt to 1.

In step S90, just as in step S30, it is determined whether the stroke sensor 68 is functioning normally in the sensor-normal determination routine (not shown). If NO is obtained, the routine proceeds to step S120. If YES is obtained, the routine proceeds to step S100, where the target deceleration Gst is calculated based on the depression stroke St referring to a map (a map of when there is an abnormality in the pressure sensor 68) which corresponds to the graph as shown by the dotted line in FIG. 4. Then in step S110, the weight $(1-\alpha)$ of the target deceleration Gst is set to 1 by setting the weight $\alpha$ to be applied to the target deceleration Gpt that is based on the master cylinder pressure Pm is set to 0.

In step S120, because there are abnormalities in both the pressure sensor 66 and the stroke sensor 68 such that appropriate braking force control is unable to be performed, the electromagnetic switching valve 24F and the like return to a non-control position. Accordingly, the pressure inside of each wheel cylinder is set to be controlled according to the pressure within the master cylinder.

In step S130, the final target deceleration Gt is calculated as the weighted sum of the target deceleration Gpt and the target deceleration Gst according to a following equation (1) below. In the embodiment illustrated, the weight $\alpha$ is calculated based on the previous final target deceleration Gtf, however it may also be calculated based on the target deceleration Gpt or Gst.

$$Gt = \alpha \cdot Gpt + (1-\alpha) Gst \quad (1)$$

In step S140, a coefficient (a positive numerical constant) of the target wheel cylinder pressure of each wheel with respect to the final target deceleration Gt is made to be Kl (l=fl, fr, rl, rr), and the target wheel cylinder pressure Pti (i=fl, fr, rl, rr) of each wheel is calculated according to Expression 2 below. Then in step S150, the wheel cylinder pressure of each wheel is controlled so as to become equal to the target brake pressure Pti.

$$Pti = Kl \cdot Gt \quad (2)$$

In this way, according to the illustrated exemplary embodiment, it is determined in step S20 whether the pressure sensor 66 is functioning normally. Then in step S30 or step S90 it is determined whether the stroke sensor 68 is functioning normally. When both sensors are functioning normally, the target deceleration Gpt that is based on the master cylinder pressure Pm is calculated in step S40. Then in step S50, the target deceleration Gst that is based on the depression stroke St is calculated. In step S60, the weight $\alpha$ to be applied to the target deceleration Gpt is calculated based on the previous final target deceleration Gtf.

Then in step S130, the final target deceleration Gt is calculated as the weighted sum of the target deceleration Gpt and the target deceleration Gst. In step S 140, the target wheel cylinder pressure Pti of each wheel is calculated based on the final target deceleration Gt. In step S150, the wheel cylinder pressure of each wheel is controlled so as to become equal to the target brake pressure Pti such that braking force of each wheel is controlled according to the braking amount by the vehicle operator, i.e., according to the master cylinder pressure Pm and the depression stroke St.

Figure 6:
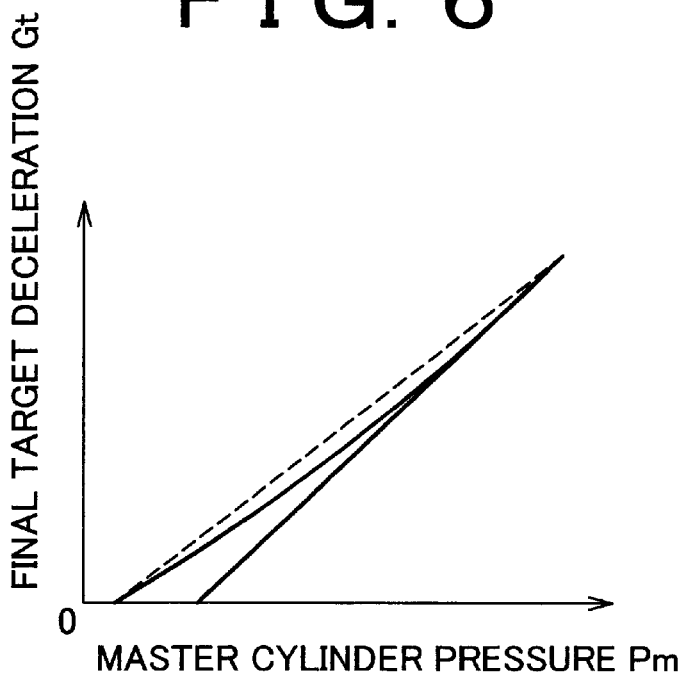
FIG. 6 is a graph showing a comparison of the relationship between the master cylinder pressure and the final target deceleration when the pressure sensor is functioning normally but there is an abnormality in the stroke sensor, in a conventional case, and in a case where the pressure sensor and the stroke sensor are functioning normally.
Figure 7:
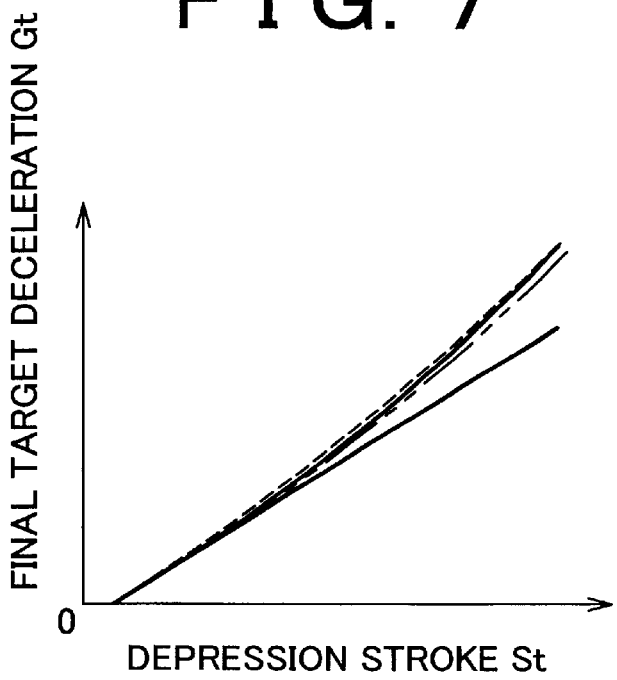
FIG. 7 is a graph showing a comparison of the relationship between the depression stroke and the final target deceleration in a case where the stroke sensor is functioning normally but there is an abnormality in the pressure sensor, in a conventional case, and in a case where the pressure sensor and the stroke sensor are functioning normally.

Accordingly, when the pressure sensor 66 and the stroke sensor 68 are functioning normally, the final target deceleration Gt changes as shown by the thin solid line in FIG. 6 when looking at the relationship between the final target deceleration Gt and the master cylinder pressure Pm, and changes as shown by the thin solid line in FIG. 7 when looking at the relationship between the final target deceleration Gt and the deceleration stroke St. Accordingly, the final target deceleration Gt increases as the braking amount by the vehicle operator increases, while the rate of increase of the final target deceleration Gt increases as the braking amount by the vehicle operator increases.

With a conventional brake control system in which the process in step S70 is not performed, even if there is an abnormality in the stroke sensor 68, the target deceleration Gpt is calculated referring to the map that corresponds to the graph as shown by the solid line in FIG. 3, just as when the stroke sensor 68 is functioning normally, and the target deceleration Gpt is set to the final target deceleration Gt. As a result, the final target deceleration Gt is calculated so as to change with respect to the master cylinder pressure Pm, as shown by the thick solid line in FIG. 6. Accordingly, the braking force in the region where the braking amount by the vehicle operator is extremely small becomes 0, and the braking force in the region where the braking amount by the vehicle operator is small becomes small compared to when the braking force is normal, such that the vehicle operator feels a sense of discomfort.

Conversely, according to the illustrated exemplary embodiment, when there is an abnormality in the stroke sensor 68 such that the detected depression stroke St is abnormal, YES is obtained in step S20 and NO is obtained in step S30. As a result, the target deceleration Gpt that is based on the master cylinder pressure Pm is calculated in step S70 so as to become a value larger than when the stroke sensor 68 is functioning normally, and such that the rate of increase of the target deceleration Gpt becomes larger the greater the braking amount by the vehicle operator. The weight $\alpha 0$ to be applied to the target deceleration Gpt is then set to 1 in step S80. Accordingly, the amount of contribution of the target deceleration Gst to the final target deceleration Gt is reduced to 0 and the braking force of each wheel is controlled with the target deceleration Gpt as the final deceleration Gt in steps S130 to S150.

According to the illustrated exemplary embodiment, when there is an abnormality in the stroke sensor 68, the final target deceleration Gt is calculated to change with respect to the master cylinder pressure Pm in the same pattern as that shown by the thin solid line in FIG. 6. Therefore, in the event that there is an abnormality in the stroke sensor 68, the vehicle operator is reliably prevented from feeling a sense of discomfort due to the braking force in the region where the braking amount by the vehicle operator is extremely small becoming 0, as well as due to the braking force in the region where the braking amount by the vehicle operator is small becoming smaller than when the braking force is normal.

Also, with a conventional brake control system in which the process in step S100 is not performed, when there is an abnormality in the pressure sensor 66, the target deceleration Gst is calculated referring to the map which corresponds to the graph as shown by the solid line in FIG. 4, just as in the case when the pressure sensor 66 is functioning normally, and the target deceleration Gst is set to the final target deceleration Gt. As a result, the final target deceleration Gt is calculated so as to change with respect to the depression stroke St, just as is shown by the thick solid line in FIG. 7. Accordingly, the braking force in the region where the braking amount by the vehicle operator is large becomes smaller than when the braking force is normal and the rate of increase of the braking force following an increase in the braking amount by the vehicle operator becomes smaller than when the rate of increase is normal, thus giving a sense of discomfort to the vehicle operator.

Conversely, according to the illustrated exemplary embodiment, when there is an abnormality in the pressure sensor 66 such that the detected master cylinder pressure Pm is abnormal, the determination in step S20 is NO and the determination in step S90 is YES. As a result, the target deceleration Gst that is based on the depression stroke St is calculated in step S100 so as to become a value larger than when the pressure sensor 66 is functioning normally, and such that the rate of increase of the target deceleration Gst becomes larger the greater the braking amount by the vehicle operator. The weight $\alpha$ to be applied to the target deceleration Gst is then set to 1 in step S110. Accordingly, the amount of contribution of the target deceleration Gpt to the final target deceleration Gt is reduced to 0 and the braking force of each wheel is controlled with the target deceleration Gst as the final deceleration Gt in steps S130 to S150.

According to the illustrated exemplary embodiment, when there is an abnormality in the pressure sensor 66, the final target deceleration Gt is calculated so as to change with respect to the depression stroke St in the same pattern as that shown by the thin solid line in FIG. 7. Therefore, in the event that there is an abnormality in the pressure sensor 66, the vehicle operator is reliably prevented from feeling a sense of discomfort due to the braking force in the region where the braking amount by the vehicle operator is large becoming smaller than when the braking force is normal, as well as due to the rate of increase of the braking force following an increase in the braking amount by the vehicle operator becoming smaller than when the rate of increase is normal.

When there are abnormalities in both the pressure sensor 66 and the stroke sensor 68, the determinations in steps S20 and S90 are NO and the electromagnetic switching valve 24F and the like return to the non-control position in step S120. As a result, the pressure in each wheel cylinder is set so as to be controlled according to the pressure in the master cylinder such that inappropriate control of the braking force of the wheels based on the detected value of the abnormal master cylinder pressure Pm and the detected value of the abnormal depression stroke St is able to be reliably prevented.

Particularly, according to the illustrated exemplary embodiment, even if there is an abnormality in either the pressure sensor 66 or the stroke sensor 68, the map for calculating the target deceleration Gpt or the target deceleration Gst changes. As a result, the final target deceleration Gt is able to be calculated simply as compared to when the target deceleration Gpt or the target deceleration Gst is calculated just as when the sensors are functioning normally, and those calculation results are corrected based on the depression stroke St or the master cylinder pressure Pm, respectively.

Also according to the illustrated exemplary embodiment, when the final target deceleration Gt is calculated based on both the detected value of the master cylinder pressure and the detected value of the depression stroke, the target deceleration Gpt based on the detected value of the master cylinder pressure and the target deceleration Gst based on the detected value of the depression stroke are calculated. The weight $\alpha$ to be applied to the target deceleration Gpt is calculated so as to become larger the greater the previous final target deceleration Gt, and the final target deceleration Gt is calculated as the weighted sum of the target decelerations Gpt and Gst according to the weight $\alpha$. Accordingly, in the region where the braking amount required by the vehicle operator is small, more emphasis is placed on the detected value of the depression stroke, which accurately reflects the braking amount required by the vehicle operator, than on the detected value of the master cylinder pressure. Conversely, in the region where the braking amount required by the vehicle operator is large, more emphasis is placed on the detected value of the master cylinder pressure, which accurately reflects the required braking amount by the vehicle operator, than on the detected value of the depression stroke. Accordingly, the braking force of each wheel is able to be controlled according to the braking amount required by the vehicle operator with a greater level of accuracy compared to when the weight is constant.

Although the invention has been described herein with reference to a specific exemplary embodiment, many modifications and variations therein will readily occur to those skilled in the art. Accordingly, all such variations and modifications are included within the intended scope of the invention.

For example, in the above exemplary embodiment, when there is an abnormality in the stroke sensor 68, the amount of contribution of the target deceleration Gst that is based on the depression stroke St to the final target deceleration Gt is reduced to 0. And, when there is an abnormality in the pressure sensor 66, the amount of contribution of the target deceleration Gpt that is based on the master cylinder pressure Pm to the final target deceleration Gt is reduced to 0. According to another embodiment, however, when there is an abnormality in the stroke sensor 68 or the pressure sensor 66 which is an abnormality such as a decrease in gain, the amount of contribution of the target deceleration Gst or Gpt to the final target deceleration Gt can also be reduced to a value that is, e.g., both lower than when the amount of contribution is normal and greater than 0.

Also in the foregoing exemplary embodiment, when there is an abnormality in the stroke sensor 68, the map for calculating the target deceleration Gpt that is based on the master cylinder pressure Pm is changed from that of the solid line in FIG. 3 to that of the dotted line in the same figure. When there is an abnormality in the pressure sensor 66, the map for calculating the target deceleration Gst that is based on the depression stroke St is changed from that of the solid line in FIG. 4 to that of the dotted line in the same figure. This reduces the effect that a reduction in the amount of contribution has on the final target deceleration Gt.

Figure 8:
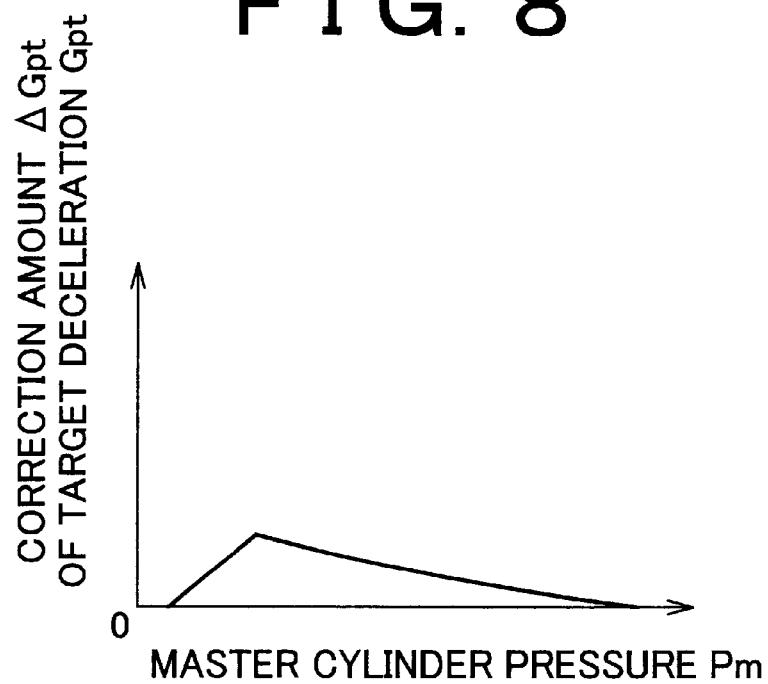
FIG. 8 is a graph showing a relationship between the master cylinder pressure and a correction amount of the target deceleration.
Figure 9:
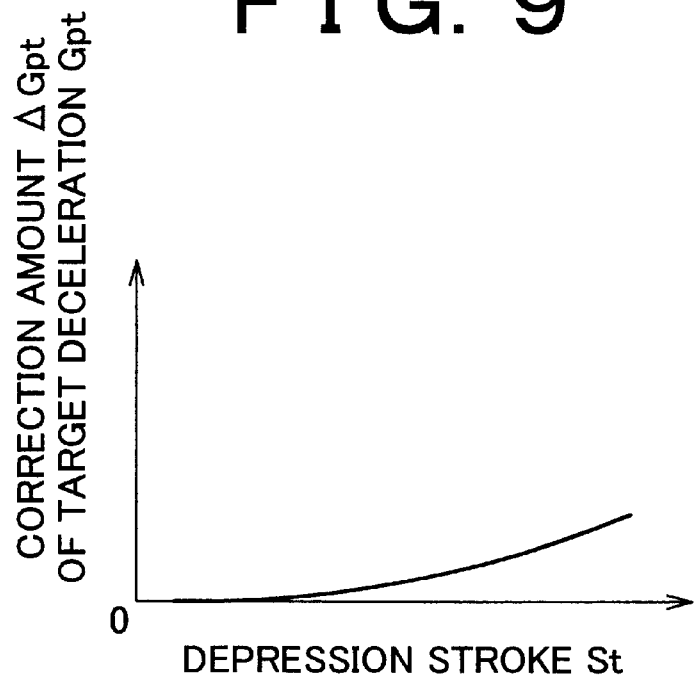
FIG. 9 is a graph showing a relationship between the depression stroke and a correction amount of the target deceleration.

According to another embodiment, however, when there is an abnormality in the stroke sensor 68, the target deceleration Gpt that is based on the master cylinder pressure Pm can be calculated referring to the map shown by the solid line in FIG. 3, while the correction amount ΔGpt of the target deceleration Gpt can be calculated based on the master cylinder pressure Pm referring to a map which corresponds to the graph shown in FIG. 8, and the target deceleration Gpt can be corrected to Gpt+ΔGpt. In addition, in the event that there is an abnormality in the pressure sensor 66, the target deceleration Gst that is based on the depression stroke St can be calculated referring to the map which corresponds to the graph as shown by the solid line in FIG. 4, while the correction amount ΔGst of the target deceleration Gst can be calculated based on the depression stroke St referring to a map which corresponds to the graph shown in FIG. 9, and the target deceleration Gst can be corrected to Gst+ΔGst.

Also according to the foregoing exemplary embodiment, when the pressure sensor 66 and the stoke sensor 68 are functioning normally, the weight a to be applied to the target deceleration Gpt is able to be set according to the previous final target deceleration Gtf. Alternatively, however, according to another embodiment, the weight to be applied to the target deceleration Gpt and the target deceleration Gst can also be constant. Also, according to the foregoing exemplary embodiment, the target deceleration Gpt is calculated referring to the map shown by the solid line in FIG. 3, which increases linearly with respect to the master cylinder pressure Pm. Alternatively, however, the target deceleration Gpt can also be calculated referring to a map shown by a chain double-dashed line in FIG. 3, which increases nonlinearly with respect to the master cylinder pressure Pm.

Further according to the foregoing exemplary embodiment, the operational force applied to the braking member by the vehicle operator is the master cylinder pressure Pm that is detected by the pressure sensor 66. However, as long as the operational force applied by the vehicle operator is a value which reflects the operational force applied to the braking member by the vehicle operator, then the operational force applied by the vehicle operator, e.g., may also be a depression force applied to the brake pedal which is detected by a depression force sensor.

As is evident from the above description, the exemplary configuration of the invention can reliably reduce the possibility of inappropriate brake control from being performed caused by the target brake control amount which is based on whichever one of the detected values is abnormal. In addition, this configuration also reliably reduces a change in the relationship between the braking force of each wheel and the braking amount by the vehicle operator generated when one of the detected value of the operational force and the detected value of the amount of displacement of the braking member is abnormal. Accordingly, a sense of discomfort felt by the vehicle operator during braking when the detected value of the operational force applied to the braking member or the detected value of the amount of displacement of the braking member is abnormal is able to be reliably reduced.

Also according to the exemplary configuration of the invention, changing the relationship between the target brake control amount and the other detected value changes the calculation mode of the target brake control amount that is based on that other detected value. Therefore, it is possible to reliably reduce a change in the relationship between the final target deceleration and the braking amount by the vehicle operator generated when one of the detected value of the operational force and the detected value of the an amount of displacement of the braking member is abnormal, e.g., as compared to when only the amount of contribution of the target brake control amount that is based on the other detected value to the final target brake control amount is changed.

Furthermore, according to another exemplary configuration of the invention, because the amount of contribution of the target brake control amount that is based on the abnormal detection value to the final target brake control amount is reduced to 0, it is possible to reliably prevent the braking force of the wheels from being inappropriately controlled caused by the target brake control amount that is based on the abnormal detected value.

In the illustrated embodiment, the microcomputer 76, or controller, is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A brake control system for a vehicle, comprising:
 a first detector that detects a first value equal to a force applied to a braking member;
 a second detector that detects a second value equal to a displacement of the braking member; and
 a controller that:
  calculates a first amount on the basis of the detected force;
 calculates a second amount on the basis of the detected displacement; and
  calculates a final target brake control quantity on the basis of the calculated first and second amounts,
  wherein when one of the detected first and second values is abnormal, and the other of the detected first and second values is normal, the controller:
  decreases a degree of contribution of the amount calculated on the basis of the abnormal value to the final target brake control quantity; and
  changes a mode for calculating the other amount calculated on the basis of the normal value to reduce an influence of the decrease of the degree of contribution on the final target brake control quantity, and changes a mode for calculating the other amount on the basis of the normal value to decrease the degree of contribution to reduce an influence on a relationship between the force applied to the braking member of the vehicle by the operator of the vehicle and the final target brake control amount.

2. A brake control system 1 for a vehicle, comprising:
a first detector that detects a force applied to a braking member of the vehicle by an operator of the vehicle;
a second detector that detects a displacement amount of the braking member of the vehicle upon application of the force to the braking member; and
a controller that:
   calculates a first target brake control amount on the basis of a first value detected by the first detector;
   calculates a second target brake control amount on the basis of a second value detected by the second detector; and
   calculates a final target brake control amount on the basis of the first target brake control amount and the second target brake control amount,
   wherein when one of the values detected by the first detector and the second detector is abnormal, and the other one of values detected by the first detector and the second detector is normal, the controller:
      decreases a degree of contribution of one of the first target brake control amount and the second target brake control amount, which is calculated on the basis of the abnormal value, to the final target brake control amount; and
      changes a mode for calculating the other one of the first target brake control amount and the second target brake control amount, which is calculated on the basis of the normal value, so as to reduce an influence of the decrease of the degree of contribution on the final target brake control amount, and the controller changes the mode for calculating the other one of the first and the second target brake control amount calculated on the basis of the normal value such that the decrease in the degree of contribution of one of the first target brake control amount and the second target brake control amount has a reduced influence on a relationship between the force applied to the braking member of the vehicle by the operator of the vehicle and the final target brake control amount.

3. A brake control system according to claim 2, wherein when the detected force applied to the braking member of the vehicle and the detected displacement amount of the braking member have normal values, the controller calculates the final target brake control amount as a weighted sum of the first target brake control amount and the second target brake control amount.

4. A brake control system according to claim 2, wherein the controller changes the mode for calculating the target brake control amount on the basis of the normal value by changing a relationship between the normal value and a corresponding one of the first target brake control amount and the second target brake control amount.

5. A brake control system for a vehicle according to claim 2, wherein the controller decreases the degree of contribution of one of the first target brake control amount and the second target brake control amount, which is calculated on the basis of the abnormal value, to the final target brake control amount to 0.

6. A brake control system according to claim 4, wherein when the force applied to the braking member of the vehicle by the operator of the vehicle detected by the first detector has an abnormal value, the controller changes the mode for calculating the second target brake control amount such that a ratio of the second target brake control amount to the final target brake control amount is increased to be larger than a ratio of the second target brake control amount to the final target brake control amount obtained when the force applied to the braking member has a normal value in an area where the force applied to the braking member of the vehicle by the operator is small.

7. A brake control system according to claim 4, wherein when the displacement amount of the braking member of the vehicle detected by the second detector has an abnormal value, the controller changes the mode for calculating the first target brake control amount such that a ratio of the first target brake control amount to the final target brake control amount is increased to be larger than a ratio of the first target brake control amount to the final target brake control amount obtained when the displacement amount of the braking member of the vehicle has a normal value in an area where the force applied to the braking member of the vehicle by the operator is large.

8. A brake control system for a vehicle according to claim 4, wherein the controller decreases the degree of contribution of one of the first target brake control amount and the second target brake control amount, which is calculated on the basis of the abnormal value, to the final target brake control amount to 0.

9. A brake control system according to claim 2, wherein:
   when the detected force applied to the braking member of the vehicle and the detected displacement amount of the braking member have normal values, the controller calculates the final target brake control amount to be a weighted sum of the first and the second target brake control amounts; and wherein:
   when one of the detected force applied to the braking member of the vehicle and the detected displacement amount of the braking member has an abnormal value and the other value has a normal value, the controller sets a weight to the one of the first and the second target brake control amounts calculated on the basis of the abnormal value to 0 so as to set the degree of contribution of the one of the first and the second target brake control amounts calculated on the basis of the abnormal value to the final target brake control amount to 0.

10. A method for controlling braking of a vehicle, comprising:
   detecting a force applied to a braking member of the vehicle by an operator;
   detecting a displacement amount of the braking member; and
   calculating a first target brake control amount on the basis of a first value corresponding to the detected force applied to the braking member;
   calculating a second target brake control amount on the basis of a second value corresponding to the detected displacement amount of the braking member; and
   calculating a final target brake control amount on the basis of the first target brake control amount and the calculated second target brake control amount,
   wherein when one of the detected first and second values is abnormal, and the other one of the detected first and second values is normal, the method further comprising:

decreasing a degree of contribution of one of the first target brake control amount and the second target brake control amount, which is calculated on the basis of the abnormal value, to the final target brake control amount; and changing a mode for calculating the other one of the first target brake control amount and the second target brake control amount, which is calculated on the basis of the normal value, so as to reduce an influence of the decrease of the degree of contribution on the final target brake control amount, and changing the mode for calculating the other one of the first and the second target brake control amount calculated on the basis of the normal value such that the decrease in the degree of contribution has a reduced influence on a relationship between the force applied to the braking member and the final target brake control amount.

11. A method according to claim 10, wherein when the detected force applied and the detected displacement amount have normal values, the method further comprising:

calculating the final target brake control amount as a weighted sum of the first target brake control amount and the second target brake control amount.

12. A method according to claim 10, further comprising:

changing the mode for calculating the target brake control amount on the basis of the normal value by changing a relationship between the normal value and a corresponding one of the first target brake control amount and the second target brake control amount.

13. A method according to claim 10, further comprising:

calculating the final target brake control amount to be a weighted sum of the first and the second target brake control amounts when the detected force applied to the braking member of the vehicle and the detected displacement amount of the braking member have normal values; and setting a weight to the one of the first and the second target brake control amounts, calculated on the basis of the abnormal value, to 0 so as to set the degree of contribution of the one of the first and the second target brake control amounts calculated on the basis of the abnormal value to the final target brake control amount to 0 when one of the detected force applied and the detected displacement amount has an abnormal value and the other value has a normal value.

* * * * *